(12) United States Patent
Wolny

(10) Patent No.: US 7,777,317 B2
(45) Date of Patent: Aug. 17, 2010

(54) CARD AND MANUFACTURING METHOD

(75) Inventor: Robert Wolny, Rum (AT)

(73) Assignee: Assa Abloy Identification Technologies Austria GmbH (Austria) (AT)

( * ) Notice: Subject to any disclaimer, the term of this patent is extended or adjusted under 35 U.S.C. 154(b) by 710 days.

(21) Appl. No.: 11/612,213

(22) Filed: Dec. 18, 2006

(65) Prior Publication Data

US 2007/0176273 A1   Aug. 2, 2007

(51) Int. Cl.
*H01L 23/02* (2006.01)
*H01L 21/00* (2006.01)

(52) U.S. Cl. ............... 257/679; 438/106; 257/E23.064

(58) Field of Classification Search ............... 257/679, 257/728, E23.064; 235/492; 343/866, 873; 438/106

See application file for complete search history.

(56) References Cited

U.S. PATENT DOCUMENTS

| 5,671,525 | A | * | 9/1997 | Fidalgo ............... 29/600 |
| 6,020,627 | A | | 2/2000 | Fries et al. |
| 6,305,609 | B1 | | 10/2001 | Melzer et al. |
| 6,521,985 | B1 | | 2/2003 | Dossetto |
| 6,568,600 | B1 | * | 5/2003 | Carpier et al. ............ 235/492 |
| 6,910,636 | B2 | * | 6/2005 | Kim et al. ................ 235/492 |
| 7,269,021 | B2 | | 9/2007 | Gundlach et al. |
| 2006/0255157 | A1 | | 11/2006 | Launay et al. |

FOREIGN PATENT DOCUMENTS

| DE | 19500925 | 7/1996 |
| DE | 19602821 | 6/1997 |
| DE | 19912201 | 8/2000 |
| DE | 10032676 | 4/2001 |
| DE | 10343734 | 4/2005 |
| EP | 0682321 | 11/1995 |
| EP | 1152368 | 11/2001 |
| EP | 1271399 | 1/2003 |
| FR | 2861201 | 4/2005 |
| WO | WO 00/36557 | 6/2000 |

OTHER PUBLICATIONS

European Examination Report issued by the European Patent Office on Dec. 7, 2005 in relation to European patent application No. 05013309.9.
Examiner Report for European Patent Application No. 05027932.3, mailed Jul. 19, 2007.

* cited by examiner

*Primary Examiner*—Sue Purvis
*Assistant Examiner*—Selim Ahmed
(74) *Attorney, Agent, or Firm*—Sheridan Ross P.C.

(57) ABSTRACT

The invention relates to a card for contactless data and/or energy transmission by means of external devices, containing a multilayer card body which has a substrate layer for accommodating an antenna coil having exposed coil connections on a top side of the substrate layer which are connected in an electrically conductive manner to connections for a chip module containing a chip, the chip being enclosed in a recess in the substrate layer; the windings of the antenna coil extend on the top side of the substrate layer, and a compensation layer extends on the top side of the substrate layer; the compensation layer has a chip module opening for placing the chip module on the substrate layer, and has a bridge opening for the contacting of connections of an antenna bridge which extends transverse to the windings.

15 Claims, 1 Drawing Sheet

CARD AND MANUFACTURING METHOD

FIELD OF THE INVENTION

The invention relates to a card energy transmission by means of external devices, containing a multilayer card body which has a substrate layer for accommodating an antenna coil having exposed coil connections on a top side of the substrate layer which are connected in an electrically conductive manner to connections for a chip module containing a chip, the chip being enclosed in a recess in the substrate layer.

The invention further relates to a method for manufacturing a card for contactless data and/or energy transmission by means of external devices, a chip module which bears a chip being connected to a substrate layer which has an antenna coil, and connections for the chip module being connected in an electrically conductive manner to coil connections for the antenna coil.

BACKGROUND OF THE INVENTION

For manufacturing a card for contactless data and/or energy transmission by means of external devices, it is known from DE 100 32 676 A1 to temporarily affix a leadframe, equipped with a chip, as a chip module to a substrate layer having an antenna coil. The antenna coil is enclosed within the substrate layer, the coil connections for electrically connecting with the connections for the chip being exposed. For connecting the chip module to the substrate layer, the chip module has projecting eyes which make an indentation in the substrate layer upon contacting of adjacent connections for the chip module to the coil connections. In the contacting position the leadframe lies flat on a surface of the substrate layer, the windings of the coil enclosed in the substrate layer being situated at a distance from the surface of the leadframe. A disadvantage herein is that the windings of the antenna must be embedded in the substrate layer. Manufacture of the card is relatively complicated due to the need for pressing the eyes of the chip module into the substrate layer.

The object of the present invention is to provide a card, a semi-finished product, and a method for manufacturing a card, such that a card to be operated in a contactless fashion and which is provided with a chip module and an antenna coil may be manufactured easily and reliably.

SUMMARY OF THE INVENTION

For achieving this object, the card according to the invention in conjunction with the preamble to claim 1 is characterized in that the windings of the antenna coil extend on the top side of the substrate layer, and a compensation layer extends on the top side of the substrate layer, the compensation layer having a chip module opening for placing the chip module on the substrate layer and having a bridge opening for the contacting of connections of an antenna bridge which extends transverse to the windings.

The particular advantage of the card according to the invention is that the use of a chip module which is provided with a chip and which has an antenna coil applied to a substrate layer is enabled in a simple manner. The compensation layer according to the invention prevents undesirable tearing of the windings and contacts for the antenna coil situated on the top side of the substrate layer, and also prevents short circuits from occurring when an antenna bridge is applied to the top side of the substrate layer.

The compensation layer is used on the one hand as height compensation for the chip module during a subsequent laminating process using further card layers. On the other hand, the compensation layer serves as electrical insulation for the antenna bridge with respect to the windings of the carrier coil, since the compensation layer also extends in a region between the windings and the antenna bridge.

According to one refinement of the invention, the compensation layer is situated in such a region that mechanical and electrical protection from the antenna bridge, preferably applied by printing, is ensured for the windings of the antenna coil. The thickness of the compensation layer preferably is a function of the thickness of a chip carrier, which bears the chip, for the chip module, so that the chip module and the antenna bridge terminate flush with the compensation layer, thereby simplifying further processing of the layers for the card.

For achieving the object, the method according to the invention in conjunction with the preamble to claim 6 is characterized in that a compensation layer is laminated to a top side of the substrate layer facing the chip module, the compensation layer having a chip module opening, of the same size as the module, for placing the chip module on the substrate layer, and having two openings for the connection by the bridge; the antenna bridge is applied to the compensation layer by screen printing; the chip module is positioned in the chip module opening by use of a nonconductive adhesive; and in a further step the connections for the chip module are contacted in an electrically conductive manner to the antenna connections by laminating the substrate layer to a lower cover layer which lies flat against the substrate layer, and laminating the compensation layer to an upper cover layer which lies flat against the compensation layer.

The particular advantage of the method according to the invention is that reliable manufacture of the card is easily ensured without the need for extensive processing of individual layers. An additional compensation layer allows long-term stable operation of a contactless card. Lamination enables a secure, intimate connection of the card layers and direct adhesion of the chip module connections to the antenna connections with electrical contacting, the windings of the antenna coil being protected from mechanical stress by the chip module itself.

According to one refinement of the invention, the antenna coil may be applied by screen printing on one side of the substrate layer without damaging the windings of the antenna coil during operation of the card as the result of using a chip module (leadframe). The substrate layer requires additional processing before it is laminated to the further card layers.

The substrate layer is provided with a punched-out opening for accommodating the chip. The compensation film is provided with a punched-out opening of the same size as the chip carrier for the chip module and the connections for the antenna bridge.

The coil connections for the substrate layer are easily electrically and mechanically connected to the connections for the chip module by means of pressure contact as the result of lamination. This ensures a particularly simple electrical contacting.

Further advantages of the invention result from the further subclaims.

One exemplary embodiment of the invention is explained below with reference to the drawings, which show the following:

DETAILED DESCRIPTION

A card according to the invention for contactless data and/or energy transmission by means of external devices has a multilayer card body which is essentially composed of a prelaminate 1 as a semi-finished product and at least one printed layer (PVC layer), adjoining the prelaminate 1, with or without an additional transparent or thermally writable overlay layer.

Figure 1:
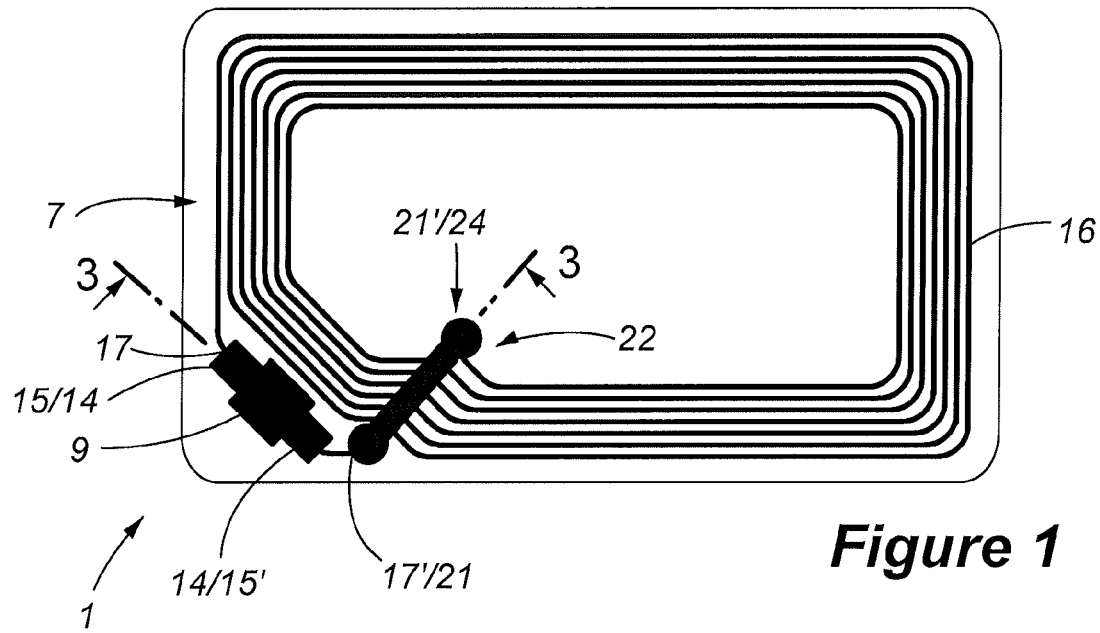
FIG. 1 shows a top view of a core layer of the card.
Figure 2:
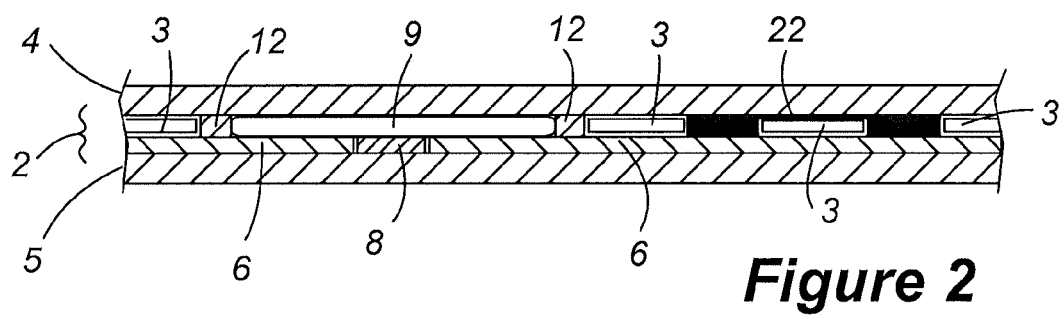
FIG. 2 shows a cross section of the core layer in the region of the section 3-3 in FIG. 1.
Figure 3:
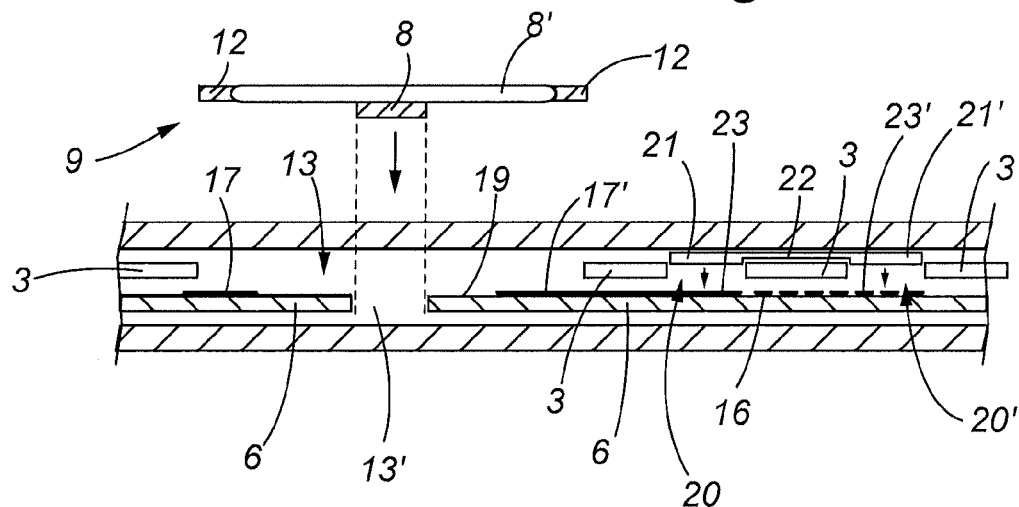
FIG. 3 shows a cross section of the core layer along the section line 3-3 in FIG. 1, in an exploded view.

FIGS. 1 through 3 illustrate a prelaminate 1 which is essentially composed of a core layer 2, an upper cover layer 4, and a lower cover layer 5.

The core layer 2 is composed of a substrate layer 6 to which an antenna coil 7 is applied. The antenna coil 7 preferably is applied by screen printing on the substrate layer 6.

The core layer 2 also has a chip module 9 and a compensation layer 3 which extend essentially in a common plane in contact with a top side 19 of the substrate layer 6. The chip module 9 has a chip 8 and a chip carrier 8'. The chip 8 is preferably situated in a middle region of the chip module 9 and is raised with respect to the chip carrier 8'. The chip module 9 is preferably designed as a leadframe, the chip carrier 8' having connections 12 for electrically contacting the chip module 9 with coil connections 17, 17' for the antenna coil 7.

The compensation layer 3 has a chip module opening 13 which allows the chip module 9 to be placed directly on the substrate layer 6. The chip module 9 is enclosed in a recess 13' in the substrate layer 6, and makes flat contact with the chip carrier 8' on the top side 19 of the substrate layer 6. The recess 13' is preferably produced by punching out an opening in the substrate layer 6.

The connections 12 for the leadframe 9 are situated in the region of end face ends 14 of the longitudinally extending leadframe 9, which has metal tabs 15, 15' that are connected to the corresponding connections for the chip 8. The metal tabs 15, 15' extend transverse to the windings 16 of the antenna coil 7, the end connections 12 of the metal tabs 15, 15' corresponding to the coil connections 17, 17' The coil connections 17, 17' are connected directly to the leadframe connections 12 by application of heat and pressure.

The stamped compensation layer 3 extends over the entire surface of the antenna side (top side 19) of the substrate layer 6, and embeds the leadframe 9. The compensation layer is used to protect the leadframe 9 and the chip 8, and to prevent the metal tabs 15, 15' of the leadframe 9 from tearing into the windings 16 during a bending stress on the card, and also serves as insulation between an antenna bridge 22 and the windings 16 of the substrate layer 6.

For electrically connecting a coil connection 17' to an oppositely situated end 24 of the windings 16, an antenna bridge 22 is provided transverse to the windings 16. The antenna bridge 22, the same as the windings 16, is made of an electrically conductive material, a first connection 21 for the antenna bridge 22 in a first bridge opening 20 in the compensation layer 3 being in electrical connection with a first connection lead 23 for the antenna coil 7, and a second connection 21' for the antenna bridge 22 in an additional bridge opening 20' in the compensation layer 3 being in electrical connection with a second connection lead 23' for the antenna coil 7. The antenna bridge 22 is produced by printing on the compensation layer 3, which is already connected to the substrate layer 6.

The compensation layer 3 depends on the thickness of the chip carrier 8'. The thickness of the compensation layer 3 is preferably equal to or greater than the thickness of the chip carrier 8'. In the present exemplary embodiment, the prelaminate 1 has a thickness of 550 μm. The upper cover film 4, the lower cover film 5, and the core layer 2 each have a thickness of 150 gm, and the compensation layer 3 has a thickness of 100 μm.

The prelaminate 1 is manufactured as follows. In a first step the antenna coil 7 is applied to the substrate layer 6 by screen printing. In a second step the recess 13' in the substrate layer 6 for accommodating the chip 8 is produced by punching out an opening. In a further step, which may also be performed before the preceding step, the compensation layer 3 is punched out, affixed to the substrate layer 6, and laminated thereto. The compensation layer 3 already has the stamped chip module opening 13 and the stamped bridge opening 20. The bridge openings 20 correspond to connection leads 23 for the antenna coil 7, thereby ensuring an electrical connection from a coil connection 17, 17' for the antenna coil 7 to an oppositely situated end 24 of the windings 16 as the result of subsequently applying the antenna bridge 22.

In a further step the antenna bridge 22 is applied by screen printing on the compensation layer 3, the connections 21, 21' for the antenna bridge 22 corresponding to the connection leads 23, 23' for the antenna coil 7.

In a further step, which may also be performed before the preceding step, for affixing the chip module 9 by screen printing an adhesive is applied in a region of the substrate layer 6 situated between the coil connections 17, 17'.

In a subsequent step the chip module 9 is positioned on the substrate layer 6 by embedding the chip 8 in the recess 13' in the substrate layer 6. This creates an adhesive bond between the chip module 9 and the substrate layer 6.

In a further step the upper cover layer 4 is affixed flatly to the compensation layer 3, and the lower cover layer 5 is affixed flatly to the underside of the substrate layer 6. By the application of heat and pressure (lamination) the cover layers 4, 5 are joined to the core layer 2 which is formed by the substrate layer 6, the compensation layer 3, and the chip module 9, and only as the result of this lamination step is an intimate, secure contacting of the connections 12 for the chip module 9 to the coil connections 17 provided.

The prelaminate 1 is preferably manufactured in a sheet which, for example, includes multiple blanks 1. For producing cards, the sheets are provided on both sides with a printed PVC film on which, if necessary, a transparent or thermally writable surface film is placed, and are bonded to the prelaminate 1. After the bonded layers of the sheets are laminated, the cards may then be punched from the sheet, corresponding to the predetermined dimensions.

What is claimed is:

1. A card for contactless communication with external devices comprising:

a multilayer card body which has a substrate layer for accommodating an antenna coil having a plurality of windings and two coil connections on a top side of the substrate layer one of which two coil connections is connected in an electrically conductive manner to a first connection for a chip module containing a chip, a compensation layer that extends on the top side of the substrate layer, the compensation layer having a chip module opening for accommodating the chip module on the substrate layer and a first bridge opening to receive the first connection of an antenna bridge and a second bridge opening to receive the second connection of the antenna bridge, the antenna bridge extending substantially transverse to the windings wherein, the first connection of the antenna bridge is connected in an electrically conductive manner to the second coil connection of the antenna coil and the second connection of the antenna bridge is connected in an electrically conductive manner to the second connection of the chip module.

2. A card according to claim 1, wherein the chip module further comprises a chip carrier which holds the chip, characterized in that the thickness of the compensation layer is a function of the thickness of a chip carrier and the compensation layer is joined to the substrate layer by lamination, and the compensation layer extends in a region between the antenna bridge and the substrate layer.

3. A card according to claim 1 characterized in that the antenna coil is printed on the substrate layer.

4. A card according to claim 1, characterized in that the chip module is held on the substrate layer exclusively by lamination, the connections for the chip module being connected in an electrically conductive manner to the coil connections for the antenna coil.

5. A semi-finished product for a card according to claim 1, characterized by a core layer comprising a substrate layer for the antenna coil, a chip module having a chip and a chip carrier, and a compensation layer which extends in the plane of the chip carrier and which is laminated to the substrate layer, the compensation layer having a chip module opening for placing the chip module on the substrate layer and having a first and second bridge opening for the contacting of the first and second connections of the antenna bridge which extends transverse to the windings, and by lamination the core layer is flatly joined to a lower cover layer situated on an underside of the substrate layer and is flatly joined to an upper cover layer situated on a top side of the compensation layer.

6. A method for manufacturing a card for contactless communication with external devices comprising:

Positioning an antenna coil on the top side of the substrate layer, the antenna coil comprising a plurality of windings and having first and second coil connections;

Laminating a compensation layer is on a top side of the substrate layer, the compensation layer having a chip module opening and first and second antenna bridge openings;

Positioning an antenna bridge onto the compensation layer in an orientation which extends substantially transverse to the windings, the antenna bridge having first and second connections, wherein the first connection of the antenna bridge extends into the first bridge opening and contacts the second of the connections for the antenna and the second connection of the antenna coil bridge opening extends into the second bridge opening; and Placing a chip module containing a chip in the chip module opening of the compensation layer and on the substrate layer, the chip module having a first connection and a second connection, such that the first connection of the chip module is electrically connected to the first connection of the antenna coil and the second connection of the chip module is electrically connected to the second connection of the antenna bridge.

7. A method according to claim 6, characterized in that the antenna coil is applied by screen printing on a top side of the substrate layer, and for accommodating the chip a recess is punched out in a region of the substrate layer provided for the chip.

8. A method according to claim 6, characterized in that the chip module opening and the first and second bridge openings in the compensation layer are punched out before affixing the compensation layer to the substrate layer.

9. A method according to claim 6, characterized in that in a first step a semi-finished product is manufactured by laminating a core layer, which is formed by the substrate layer, the chip module, and the compensation layer, to cover layers placed on both sides of the core layer, and in a second step a card body is manufactured by laminating further card layers placed on both sides of the semi-finished product.

10. A method according to claim 6, characterized in that the semi-finished product and/or the card are manufactured in card blanks.

11. The method according to claim 6, further comprising laminating the substrate layer to a lower cover layer which lies flat against the substrate layer, and laminating the compensation layer to an upper cover layer which lies flat against the compensation layer whereby the first and second connections for the chip module are contacted in an electrically conductive manner to the first and second connections of the antenna coil.

12. The method of claim 6, wherein the step of positioning the antenna bridge onto the compensation layer comprises screen printing the antenna bridge onto the compensation layer.

13. The method of claim 6, further comprising securing the chip module to the substrate layer with a non-conductive adhesive.

14. A card according to claim 1, wherein the chip is enclosed in a recess in the substrate layer.

15. A method according to claim 6, characterized in that the chip is placed in a recess in the substrate layer.

* * * * *